United States Patent Office 3,608,449
Patented Sept. 28, 1971

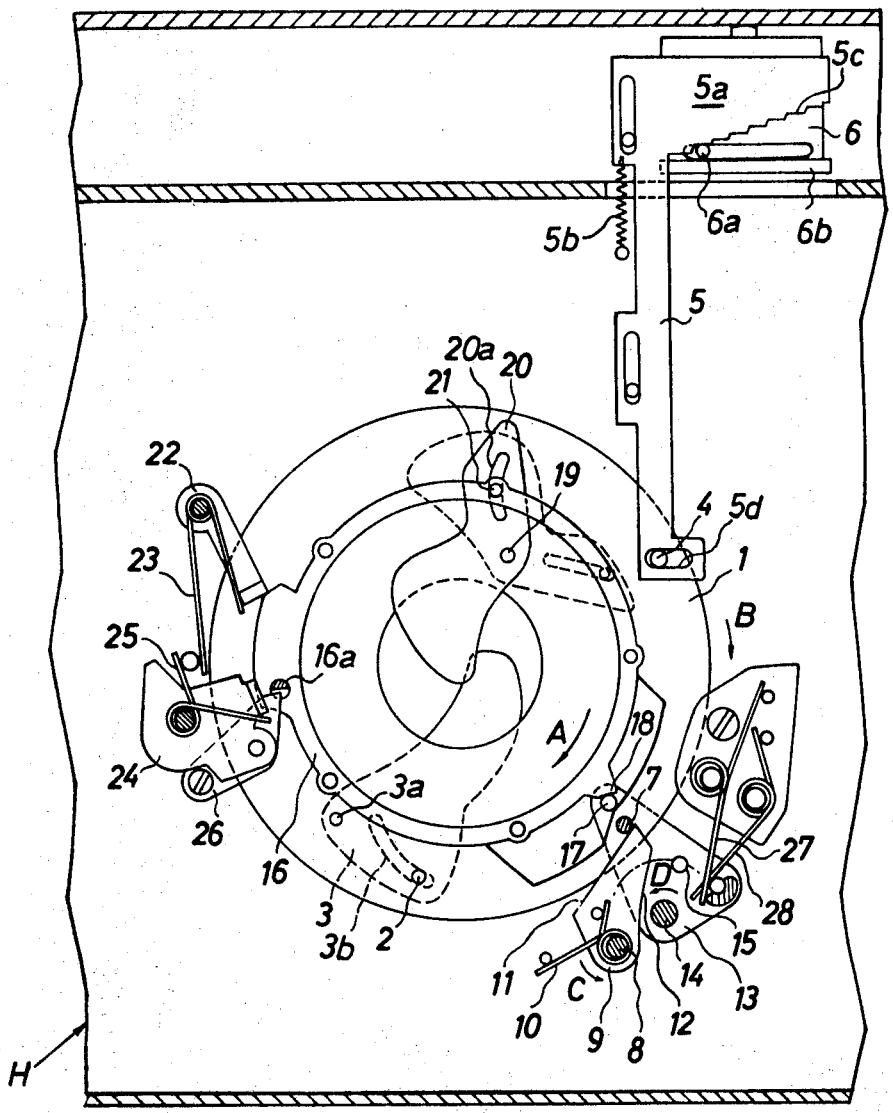

3,608,449
EXPOSURE CONTROL FOR PHOTOGRAPHIC
APPARATUS
Gunter Fauth, Unterhaching, Horst Guthke, Munich, and
Willi Schulz, Schwenningen (Neckar), Germany, assignors to Agfa-Gevaert Aktiengesellschaft, Leverkusen, Germany
Filed June 19, 1970, Ser. No. 47,808
Claims priority, application Germany, June 27, 1970,
G 69 25 596.5
Int. Cl. G03b 7/14, 9/22, 9/62
U.S. Cl. 95—10C
10 Claims

ABSTRACT OF THE DISCLOSURE

An exposure control for still cameras wherein the needle of a moving-coil instrument is scanned by a movable scanning member which is coupled to a first ring for diaphragm vanes to adjust the aperture size as a function of scene brightness. The shutter blades are coupled to a second ring which can be propelled by an impeller to leave a starting position and to thereby open the blades for an interval of time which depends on the extent of movement of the second ring from its starting position. Such extent is determined by the first ring by way of a timer cam which is biased against a pin of the first ring and has a cam face extending into the path of movement of an arresting lever which is pivoted by the second ring.

BACKGROUND OF THE INVENTION

The present invention relates to photographic apparatus in general, and more particularly to improvements in photographic apparatus with built-in exposure controls. Still more particularly, the invention relates to an exposure control of the type wherein the position of a needle, forming part of a light meter, changes as a function of changes in scene brightness and wherein the needle serves as a means for determining the aperture size and the exposure time.

SUMMARY OF THE INVENTION

An object of the invention is to provide a simple, reliable, compact and inexpensive exposure control which can be built into many types of photographic apparatus.

Another object of the invention is to provide an exposure control which is sufficiently rugged to be capable of employing an impeller-operated shutter.

A further object of the invention is to provide an exposure control which is capable of accurately selecting the aperture size and the exposure time as a function of scene brightness and wherein such selection of both exposure values takes place in automatic response to actuation of the camera release.

An additional object of the invention is to provide an exposure control wherein each aperture size corresponds to a predetermined exposure time and vice versa.

The invention is embodied in a photographic apparatus whose exposure controlling structure comprises light meter means including an output member movable between plural positions as a function of scene brightness which is determined by a customary photosensitive receiver or the like, diaphragm means including rotary setting means and at least one vane movable by the setting means to a plurality of positions each corresponding to a different aperture size, scanning means displaceable into engagement with the output member and coupled to the setting means to position the vane as a function of scene brightness, a shutter including a rotary carrier, at least one blade movable from a closed to an open position in response to movement of the carrier from a starting position whereby the extent of movement of the carrier from such starting position determines the length of exposure time, and impeller means operative to propel the carrier from its starting position, arresting means movable with the carrier, and adjusting means for determining the extent of movement of the arresting means. The adjusting means includes timer cam means movable by the setting means between plural positions each corresponding to a different scene brightness and provided with a cam face located in the path of movement of the arresting means.

The novel features which are considered as characteristic of the invention are set forth in particular in the appended claims. The improved exposure control itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single figure is an enlarged fragmentary vertical sectional view of a still camera embodying an exposure control which is constructed and assembled in accordance with our invention.

DESCRIPTION OF THE PREFERRED EMBODIMENTS

The drawing shows the housing H of a still camera which contains the improved exposure control. The exposure control comprises a light meter 6, e.g., a conventional moving-coil instrument which is electrically connected with a photosensitive receiver (not shown) and has a pivotable output member in the form of a needle 6a movable in a slot provided in the casing of the light meter 6 and along a stationary back support or anvil 6b. The position of the needle 6a is a function of scene brightness and such position can be determined by a scanning member 5a having a serrated edge face 5c and movable up and down under and against the action of a return spring 5b. The downwardly extending arm 5 of the scanning member 5a has an elongated slot 5d for a pin 4 provided on a rotary setting ring 1 forming part of an adjustable diaphragm. This setting ring 1 is provided with several equidistant pins 2 each extending into an arcuate slot 3b of a diaphragm vane 3 (only one shown). Each vane 3 is pivotable on a pin 3a which is fixed to the housing H. When the edge face 5c engages the needle 6a, the size of the aperture defined by the vanes 3 is a function of scene brightness.

The setting ring 1 is further provided with a projection in the form of a pin 7 which is in contact with a flat cam face 11 provided on a timer cam 9 which is pivotable on a fixed pin 8. The face 11 is biased against the pin 7 by a torsion spring 10 which tends to turn the cam 9 in a counterclockwise direction as indicated by the arrow C. The cam 9 is further provided with a second substantially flat cam face 12 located in the path of movement of an arresting lever 13 which is pivotable on a fixed pin 14. The arresting lever 13 has a projection or pin 15 which strikes against the cam face 12 when the lever 13 is free to turn in a counterclockwise direction (arrow D). The arresting lever 13 is biased in a counterclockwise direction by torsion springs 27 and 28. These springs urge a projection or pin 17 of the arresting lever 13 against a projection 18 provided on a ring-shaped carrier 16 which is concentric with the setting ring 1 and forms part of the shutter. The shutter further comprises blades 20 (only one shown) each pivotable on a fixed pin 19 and each having an arcuate slot 20a for a pin 21 of the carrier 16.

The carrier 16 is shown in a starting position in which the blades 20 are closed. The means for normally holding the carrier 16 in such starting position comprises a camera release 22 which is biased against a shoulder on the carrier 16 by a torsion spring 23. The shutter further comprises an impeller 24 having a pawl 26 which bears against a stop pin 16a on the carrier 16 and can rotate the carrier in a clockwise direction (arrow A) as soon as the release 22 is moved away from the illustrated blocking position.

In a manner known per se, the length of the exposure time is a function of the extent to which the impeller 24 can move the carrier 16 from the illustrated starting position, and the extent of such movement is determined by the timer cam 9 whose face 12 extends into the path of movement of the pin 15 on the arresting lever 13. The latter shares all movements of the carrier 16 because its pin 17 is biased against the projection 18 by the torsion springs 27 and 28.

The operation:

Prior to making an exposure, the user of the camera frees the needle 6a. The needle then assumes a position which is a function of scene brightness. The scanning member 5a is thereupon caused to engage the needle 6a and to clamp it against the back support 6b. This causes the arm 5 of the scanning member to turn the setting ring 1 in a clockwise direction (arrow B) and to select the positions of vanes 3 in dependency on the prevailing scene brightness. At the same time, the pin 7 on the setting ring 1 slides along the face 11 of the timer cam 9 which is biased by the torsion spring 10 so that its angular position is a function of the angular position of the setting ring 1 and thus also depends on scene brightness.

To make an exposure, the user thereupon turns the camera release 22 in a clockwise direction to free the carrier 16 which is propelled by the impeller 24 to turn in a clockwise direction (arrow A) to the extent determined by the position of the face 12 on the timer cam 9. The arresting lever 13 shares the movement of the carrier 16 and brings the carrier to a halt when the pin 15 strikes against the cam face 12.

The springs 27, 28 store energy during movement of the carrier 16 from the illustrated starting position and thereupon assist in returning the carrier to such starting position.

The inclination of cam faces 11, 12 is selected in such a way that the angular position of the setting ring 1 remains unchanged when the pin 15 of the arresting lever 13 strikes against the timer cam 9. Thus, the angular position of each vane 3 remains unchanged and the aperture size is best suited to enable the camera to make a satisfactory exposure under the prevailing lighting conditions. The cam faces 12, 11 preferably make an acute angle.

When the carrier 16 returns to the illustrated starting position, its shoulder is reengaged by the release 22 and the camera is ready for the next exposure.

It is clear that the scanning means for the needle 6a of the light meter 6 may include one or more levers which are pivotable rather than reciprocable and which can adjust the angular position of the setting ring 1 as a function of scene brightness.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In a photographic apparatus, an exposure control comprising light meter means including an output member movable between plural positions as a function of changes in scene brightness; diaphragm means including rotary setting means and at least one vane movable by said setting means to plural positions each corresponding to a different aperture size; scanning means displaceable into engagement with said output member and coupled to said setting means to position said vane as a function of scene brightness; shutter means including a rotary carrier, at least one blade movable from a closed to an open position in response to movement of said carrier from a starting position whereby the extent of movement of said carrier from such starting position determines the length of exposure time, and impeller means operative to propel said carrier from said starting position; arresting means movable with said carrier; and adjusting means for determining the extent of movement of said arresting means, including timer cam means movable by said setting means between plural positions each corresponding to a different scene brightness and provided with a cam face located in the path of movement of said arresting means.

2. An exposure control as defined in claim 1, wherein said timer cam means is further provided with a second cam face and said setting means includes a projection arranged to move said second cam face in response to rotation of said setting means.

3. An exposure control as defined in claim 2, wherein said timer cam means is pivotable about a fixed axis and wherein the inclination of said cam faces is such that the angular position of said setting means remains unchanged when the arresting means is propelled against said first mentioned cam face.

4. An exposure control as defined in claim 3, wherein said arresting means comprises a lever pivotable about a fixed axis in response to rotation of said carrier from said starting position.

5. An exposure control as defined in claim 1, further comprising resilient means for biasing said arresting means against said carrier.

6. An exposure control as defined in claim 5, wherein said timer cam means is provided with a second cam face and said setting means has a projection, and further comprising means for biasing said second cam face against said projection.

7. An exposure control as defined in claim 1, wherein said arresting means comprises a projection which strikes against said cam face in response to rotation of said carrier from said starting position.

8. An exposure control as defined in claim 1, further comprising a plurality of springs for biasing said arresting means against a projection provided on said setting means.

9. An exposure control as defined in claim 1, wherein said setting means comprises a first ring and said carrier comprises a second ring, which is concentric with said first ring.

10. An exposure control as defined in claim 1, further comprising release means movable to and from a blocking position in which said release means holds the carrier in said starting position.

References Cited

UNITED STATES PATENTS

| | | | |
|---|---|---|---|
| 2,878,737 | 3/1959 | Clark et al. | 95—64(C) |
| 3,165,996 | 1/1965 | Kiper et al. | 95—64(C) |
| 3,291,018 | 12/1966 | Singer | 95—10(C) |
| 3,380,356 | 4/1968 | Kiper et al. | 95—10(C) |
| 3,511,144 | 5/1970 | Gotze | 95—53X |

JOSEPH F. PETERS, JR., Primary Examiner

U.S. Cl. X.R.

95—53R, 63